(12) United States Patent
Vizireanu et al.

(10) Patent No.: US 8,090,145 B2
(45) Date of Patent: Jan. 3, 2012

(54) SYSTEM AND METHOD FOR ANALYZING AND MARKING FILM

(75) Inventors: Ion Vizireanu, Westlake Village, CA (US); Yousef Wasef Nijim, Valencia, CA (US); Mike Arthur Derrenberger, Hopkinton, MA (US)

(73) Assignee: Thomson Licensing, Boulogne-Billancourt (FR)

( * ) Notice: Subject to any disclaimer, the term of this patent is extended or adjusted under 35 U.S.C. 154(b) by 595 days.

(21) Appl. No.: 12/304,606

(22) PCT Filed: Jun. 17, 2006

(86) PCT No.: PCT/US2006/023666
§ 371 (c)(1),
(2), (4) Date: Dec. 12, 2008

(87) PCT Pub. No.: WO2007/149070
PCT Pub. Date: Dec. 27, 2007

(65) Prior Publication Data
US 2009/0202104 A1    Aug. 13, 2009

(51) Int. Cl.
*G06K 9/00* (2006.01)
(52) U.S. Cl. ............................... 382/100; 713/176
(58) Field of Classification Search .................. 382/100, 382/232; 380/54, 210, 252, 287; 713/176; 704/200.1, 273; 348/460, 463
See application file for complete search history.

(56) References Cited

U.S. PATENT DOCUMENTS

| 5,889,868 A * | 3/1999 | Moskowitz et al. .......... 713/176 |
| 6,285,774 B1 * | 9/2001 | Schumann et al. ........... 382/100 |
| 6,674,875 B1 * | 1/2004 | Phillips et al. ................ 382/100 |
| 7,289,644 B2 * | 10/2007 | Duffield et al. ............... 382/100 |
| 7,433,489 B2 * | 10/2008 | Wendt ........................... 382/100 |
| 2003/0185417 A1 | 10/2003 | Alattar et al. |

FOREIGN PATENT DOCUMENTS

| EP | 1519311 | 3/2005 |
| WO | WO 00/56058 | 9/2000 |
| WO | WO 02/23905 | 2/2002 |
| WO | WO2005/122080 A1 | 12/2005 |

OTHER PUBLICATIONS

Search Report dated Jun. 19, 2007.

* cited by examiner

*Primary Examiner* — Anand Bhatnagar
(74) *Attorney, Agent, or Firm* — Robert D. Shedd; Robert B. Levy; Michael A. Pugel

(57) ABSTRACT

A system and method for analyzing and marking a film image for providing a marked film with robust marks which have a high survival rate during, e.g., unauthorized duplication. The present invention provides the ability to facilitate the choosing of ideal locations of marks for marking a film image by recommending potential marking locations based on the survivability of the mark against different background colors. The system and method provides for selecting at least two potential marking areas in at least one frame of the film, saturating the at least two potential marking areas in a predetermined color of a mark, calculating a root mean square error (RMSE) of each of the at least two potential marking areas and an area surrounding each potential marking area, and determining which of the at least two potential marking areas has the lowest RMSE, i.e., the recommend marking location.

20 Claims, 4 Drawing Sheets

SYSTEM AND METHOD FOR ANALYZING
AND MARKING FILM

This application claims the benefit under 35 U.S.C. §365 of International Application PCT/US2006/023666, filed Jun. 17, 2006, which was published in accordance with PCT article 21(2) on Dec. 27, 2007, in English.

TECHNICAL FIELD OF THE INVENTION

The present invention generally relates to film security, and more particularly, to a system and method for analyzing and marking a film image for anti-piracy purposes.

BACKGROUND OF THE INVENTION

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Piracy concerns in connection with the theatrical exhibition of motion picture films are well known. Once a film distributor distributes prints of a motion picture film to exhibitors for theatrical exhibition, often a certain degree of control over the product is lost. For example, in the regular course of exhibiting the film in a theater, whether analog or digital, a customer in the theater may surreptitiously record the film using, e.g., a hand held camcorder during the exhibition. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy of relatively high quality can be made. Alternatively, the print itself may be scanned to create a video master.

Such illicit "pirate" copies of a movie can now be distributed over the Internet or by using hard copies (video CDs or DVDs), and this reduces the economic value of the legitimate film distribution. With the advent of the Internet and affordable higher quality recording devices, this problem has become increasingly severe in recent years. Thus, a method for tracing the chain of people who produce this damage is highly desirable.

In 1982, the Motion Picture Association of America (MPM), together with the Kodak™ Corporation, developed a technology for uniquely identifying film prints. This technology is commonly known as Coded Anti-piracy (CAP) coding. The code is a series of faint dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print identifier. The film prints are usually coded for each particular theater in which a film is distributed.

Typically, in the past, aiming an analog camcorder at a theater screen produced a poor quality, flickering image, but the coding dots usually survived the copying and reproduction process so that the serial number of the movie print could be obtained. However, the advent of digital video compression and distribution technologies has diminished the viability of CAP coding. Improved digital camcorders not only take higher quality pictures, but video compression algorithms (which are commonly employed when the pirated film is stored in a digital format or transported over the Internet) tend to obliterate the CAP codes. Namely, because the dots representing the code are extremely small and diffuse, they are susceptible to disintegration during video compression. Furthermore, the loss of a single CAP code dot during image compression can defeat the CAP coding scheme because the CAP code is represented by spatial image placement within the film frame. Indeed, CAP coding is dependent upon 100% image survival.

In addition, the frequency of code image repetition in CAP coding systems increases the likelihood that the public will see the image. This is undesirable as it can distract viewers from the film content or cause them to form an opinion that a particular theater shows poor quality prints.

Both Technicolor™ and Deluxe™ film laboratories have introduced newer systems that improve upon CAP coding. These systems place different patterns of dots in different frames of the film to be marked, and using these patterns encode a serial number for the print. However, in such systems the locations of the marks within a frame have either been uncontrolled or fixed.

Accordingly, a system and method for marking a film in a manner that provides a marked film that is robust and durable, avoids the limitations and deficiencies of CAP coding, and provides markings which have excellent survival despite pirating and compression, yet which are invisible, is highly desirable.

SUMMARY

The present invention provides a system and method for analyzing and marking a film image for providing a marked film with robust marks which have a high survival rate during, e.g., unauthorized duplication. The present invention provides the ability to facilitate the choosing of ideal locations of marks for marking a film image that can be used for forensic purposes to trace the film, e.g., in cases of piracy. The present invention will automate the marking process of a film by recommending potential marking locations based on the survivability of the mark against different background colors.

In one aspect of the present invention, a system for analyzing and marking a film is provided. The system includes a prescreening device configured to superimpose a depiction of potential marking areas on at least one frame of the film. The prescreening device includes a marking module. The marking module includes a color analyzer configured to saturate at least two potential marking areas in a predetermined color of a mark, and a RMSE calculator configured to calculate a root mean square error (RMSE) of each of the at least two potential marking areas and an area surrounding each potential marking area. The marking module is further configured to determine which of the at least two potential marking areas has the lowest RMSE.

In another aspect of the present invention, a method for determining mark locations in a film is provided. The method includes selecting at least two potential marking areas in at least one frame of the film, calculating a root mean square error (RMSE) of each of the at least two potential marking areas and an area surrounding each potential marking area, and determining which of the at least two potential marking areas has the lowest RMSE. Selecting at least two potential marking areas further includes superimposing a grid including identification axes on the at least one frame, determining the position of the grid relative to the frame, and selecting a location of the potential marking areas as comprising points of intersection of the identification axes.

In a further aspect, the method further includes determining the potential marking area having the lowest RMSE for the same location in at least a predetermined number of consecutive frames.

According to another aspect of the present invention, a program storage device readable by a machine, tangibly embodying a program of instructions executable by the machine to perform method steps for determining mark locations in a film is provided. The method includes selecting at least two potential marking areas in at least one frame of the film, saturating the at least two potential marking areas in a predetermined color of a mark, calculating a root mean square error (RMSE) of each of the at least two potential marking areas and an area surrounding each potential marking area, and determining which of the at least two potential marking areas has the lowest RMSE.

BRIEF DESCRIPTION OF THE DRAWINGS

These, and other aspects, features and advantages of the present invention will be described or become apparent from the following detailed description of the preferred embodiments, which is to be read in connection with the accompanying drawings.

In the drawings, wherein like reference numerals denote similar elements throughout the views.

Figure 1:
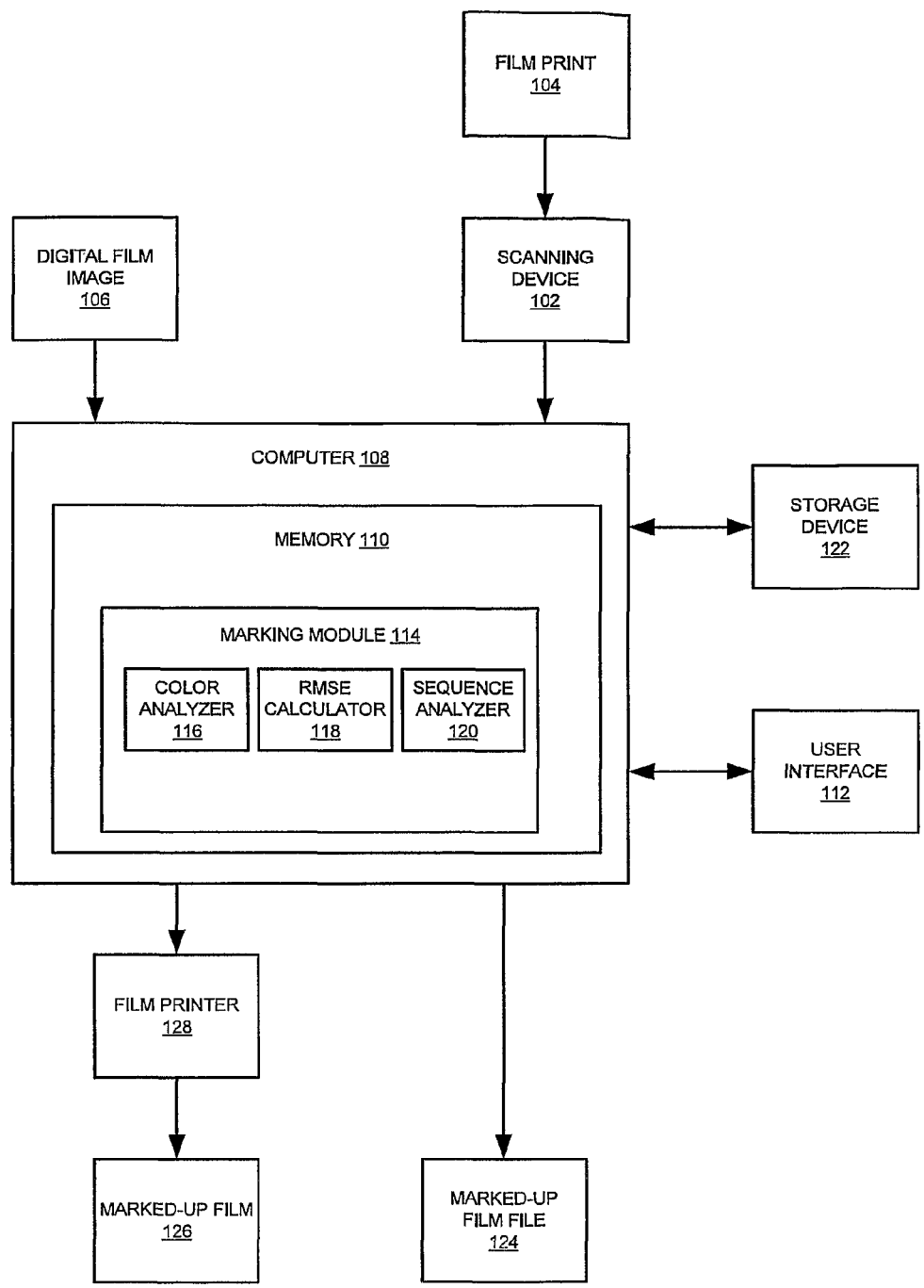
FIG. 1 is an exemplary illustration of a system layout according to an aspect of the present invention.

It should be understood that the drawing(s) is for purposes of illustrating the concepts of the invention and is not necessarily the only possible configuration for illustrating the invention.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for teaching purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Software provided according to an aspect of the present invention can analyze film images and recommend potential locations and types of marks to help minimize the use of marks which may not be effective or may be distracting to a party viewing the image or the movie. Indeed, if marks are made at undesirable locations, the marks might not survive (e.g., be detectable) after unauthorized reproduction (e.g., after being recorded by a camcorder). The present invention reduces the possibility of marking, e.g., dark scenes, or scenes with colors where the mark will not survive after printing the film, and enables the selection of better marks with, e.g., different shapes that will survive pirating.

Advantageously, the present invention facilitates the selection of marks during prescreening of movies, by helping the operator choose marks by suggesting locations for a mark based on the survivability of the mark on different background colors.

Marks survive pirating/reproduction processes differently depending on the various color intensities and colors used. The present invention includes an algorithm which is based on filtering colors such as RGB (red, green, blue). The algorithm calculates the root mean square error (RMSE) of the areas surrounding a desired mark to test the effect of background colors on the mark. A test block size is determined relative to a mark size of a marking device and the scanning method used to produce the digital image. In one embodiment, a test block is selected and saturated in a predetermined color of a mark then a root mean square error will be applied to the test block and surrounding areas to determine the recommended, acceptable or unacceptable areas for presentation to the user, and the user can thereafter make a final decision on where to put the mark(s). The recommended/acceptable marking areas will be determined based on the survivability of the mark against different background colors.

Referring now to the Figures, exemplary system components according to an embodiment of the present invention are shown in FIG. 1. A scanning device 102 may be provided for scanning film prints 104, e.g., camera-original film negatives, into a digital format, e.g. Cineon-format or SMPTE DPX files. The scanning device 102 may comprise, e.g., a telecine or any device that will generate a video output from film such as, e.g., an Arri LocPrO™ with video output. Alternatively, files from the post production process or digital cinema 106 (e.g., files already in computer-readable form) can be used directly. Potential sources of computer-readable files may be AVID™ editors, DPX files, D5 tapes etc and the like.

Scanned film prints are input to a pre-screening device 108, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 122 and a printer 128.

Alternatively, files/film prints already in computer-readable form 106 (e.g., digital cinema, which for example, may be stored on external hard drive 122) may be directly input into the computer 108. Note that the term "film" used herein may refer to either film prints or digital cinema.

A software program includes a marking module 114 stored in the memory 110. The marking module 114 includes a color analyzer 116, a RMSE calculator 118 and a sequence analyzer 120 which evaluates and processes the prints (e.g., assists in analyzing as well as marking the film/digital cinema) so that each film image may be optimally marked. The color analyzer 104 analyzes a test block of a potential marking area of each selected frame of a plurality of frames for determining the color of the block, e.g., the values of RGB of the pixels in the block. The RMSE calculator 118 calculates the root mean square error of the test block and a surrounding test area. The sequence analyzer 102 determines a predefined number of blocks having the lowest RMSE for a particular location within at least a predetermined number of consecutive frames out of the plurality of frames, as further described below with reference to step 320 of FIG. 3. Once the potential locations for the mark have been determined, the marking module 114 will cause an image of at least one frame of the film to be displayed on the display device with the potential marking areas indicated, e.g., by highlighting, encircling, etc. The marking module 105 may also show, e.g., different colors, shapes, or sizes of marks that are available for applying to an image.

A database may be externally provided on a server accessible via a network (e.g., Internet) or stored on storage device 122. The resultant output after, e.g., user selection of desired areas for placement of a mark, comprises an optimally marked film file 124 from the computer 108 and/or a marked-up film print 126 printed from a film printer 128 functionally connected to the computer 108.

Figure 2:
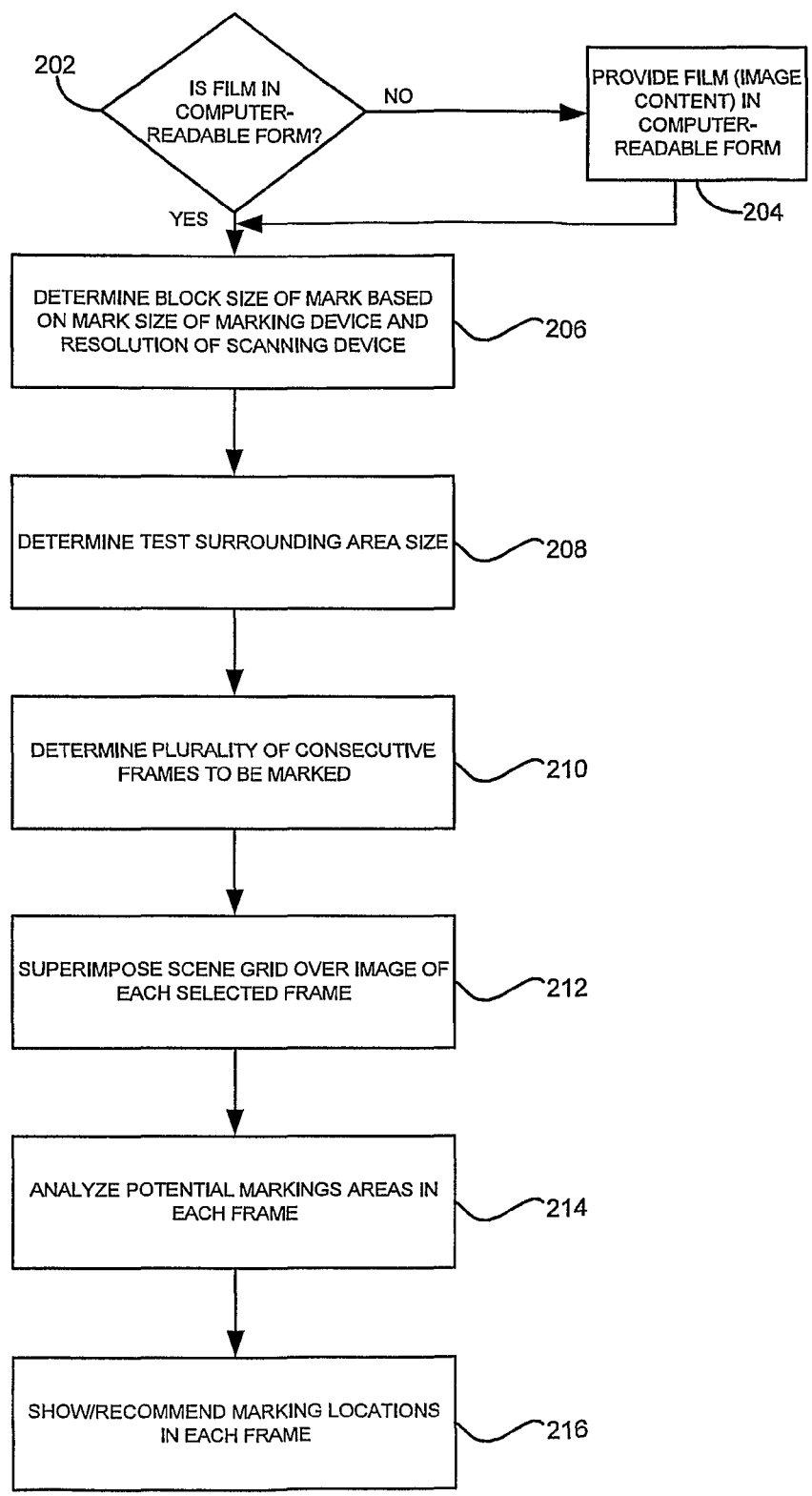
FIG. 2 is a flow diagram of an exemplary method for marking a film according to an aspect of the present invention.
Figure 3:
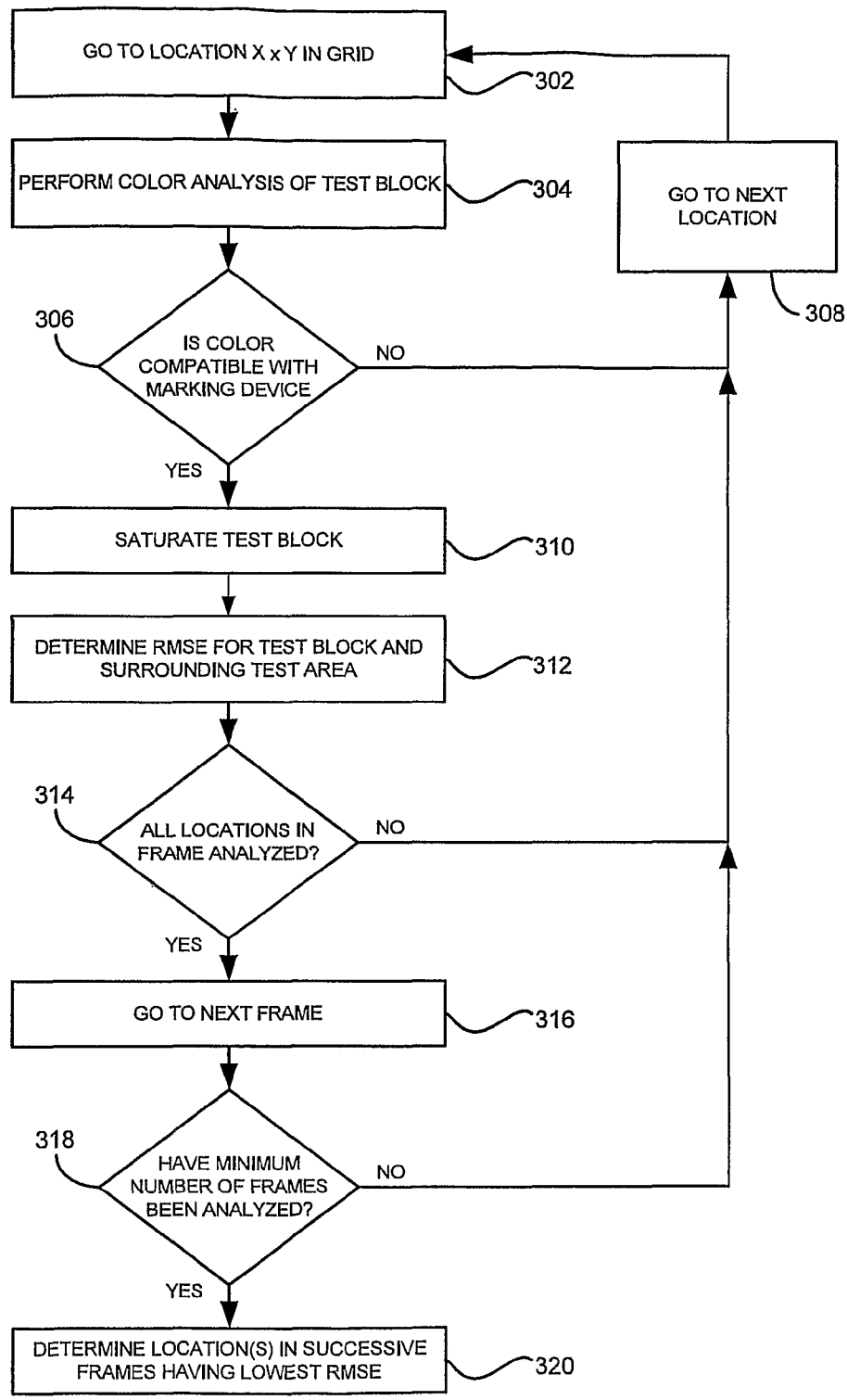
FIG. 3 is a flow diagram of an exemplary method for analyzing and marking a film frame according to an aspect of the present invention.
Figure 4:
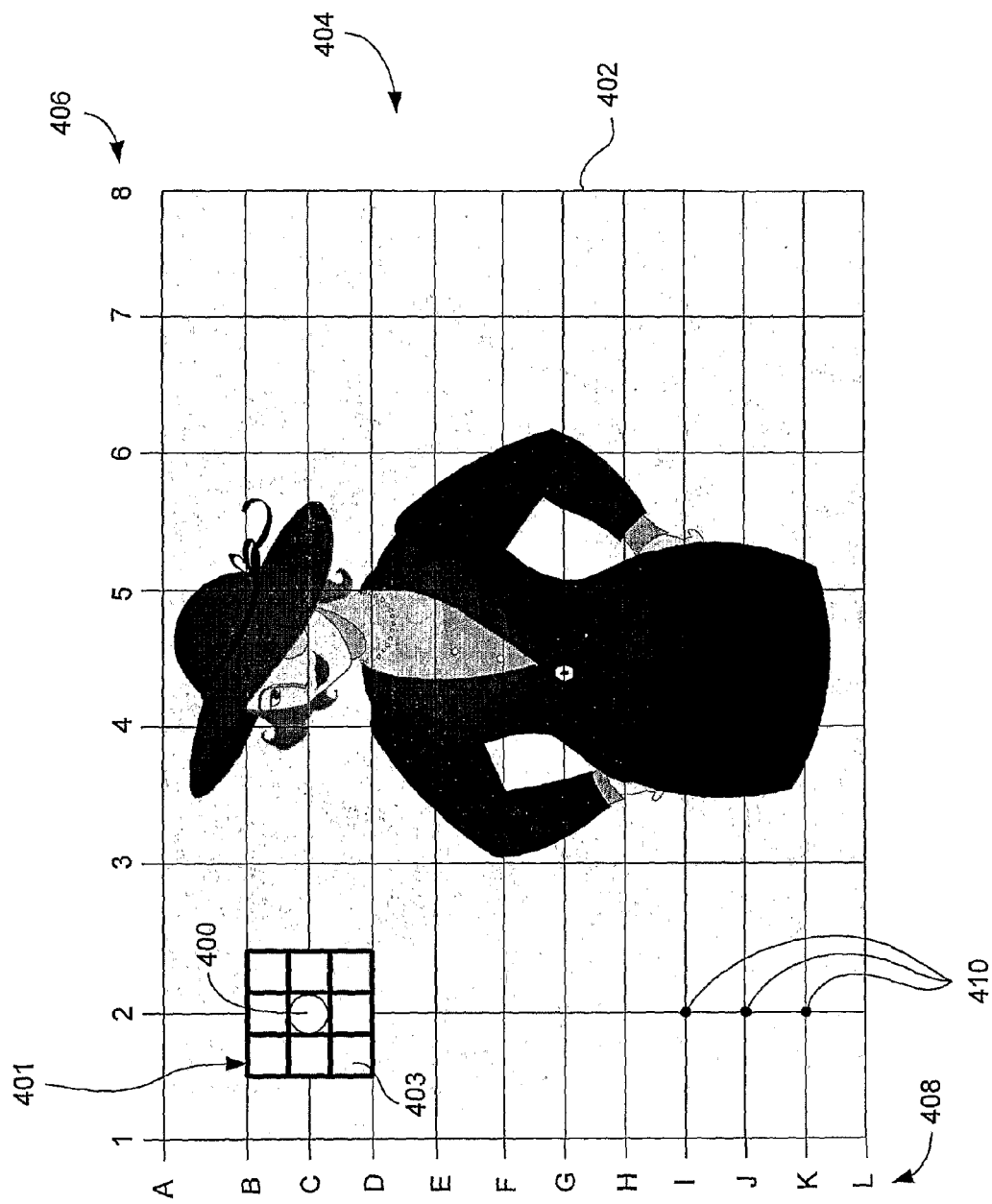
FIG. 4 is an exemplary depiction of a film image to be marked shown with a grid display superimposed thereon and an exemplary test area according to an aspect of the present invention.

FIG. 2 is a flow diagram of an exemplary overview of a method for determining ideal and actual marking locations on a film according to an aspect of the present invention. FIG. 3 depicts exemplary steps of a method of analyzing a mark and surrounding test area for determining ideal (recommended/acceptable) marking locations within each image. FIG. 4 depicts an exemplary scene grid 401 superimposed on an image, as well as a sample test area.

Referring to FIG. 2, in step 202, it is ascertained whether the film is in a computer-readable format. If no, the film is scanned, at step 204, and proceeds to step 206; if yes, the process proceeds directly to step 206. It is to be appreciated that whether the film is scanned or already in digital format, the digital file of the film will include indications or information on locations of the frames, e.g., a frame number, time from start of the film, etc. which will be used in locating potential marking areas. Once the image information is available in a computer readable format, the software (e.g., marking module 114) is used to display the image.

In step 206, a block size of a potential mark 400 is determined in pixels. The block size is determined based on mark size, e.g., approximately 100-220 microns, of the marking device to be employed on the film The block size may also be affected by the type of film being used and on the resolution of the scanning device used to acquire the film in the digital format. For example, if 35 mm film is being used, an image or frame occupies 20 mm of the film, the mark size is 100 microns and the scanning device has a resolution of 2000 pixels, the number of pixels per mark would be 10×10. Numerous methods for converting microns into pixels are known in the art and may be employed in accordance with the principles of the present invention.

Once the block size has been determined, a surrounding test area size will be determined at step 208. The test area will equal to a sufficient number of blocks to surround the block 400 of the potential mark. For example, if the block of the potential mark is a square block, the surrounding test area 401 will be area of 3×3 grid of blocks, each block 403 being the substantially the same size as the block 400 of the potential mark. Referring to the example above, the surrounding test area 401 would encompass 30×30 pixels. It is to be appreciated that the test block 400 of the potential mark may be any shape, e.g., a circle, triangle, etc., and the blocks 403 of the surrounding area 401 will be of the same shape.

In step 210, a user may optionally input to the software a predetermined number of consecutive frames in a film/digital cinema which are desired to be marked. Preferably, a minimum of at least two frames is necessary; if no entry is made, the default predetermined number of frames is automatically selected/retrieved as comprising two consecutive frames.

The software preferably displays the image of each selected frame along with information that can be used to select marking locations, in step 212. Useful information in this respect is a frame number or time and some indication of the available marking locations. For example, turning to FIG. 4, a rectangular grid 402 may be superimposed over an image of the film, e.g., a frame 404. The grid is comprised of a plurality of labeled columns 406 and rows 408, which define a plurality of intersections 410 (i.e., potential marking areas) at which a mark may be placed. That is, e.g., a grid may be provided showing squares with identification axes, and a program may be provided that would allow a user to click on desired mark locations with a pointing device. Potential marking areas of a frame may comprise, e.g., all grid intersections 410 of a superimposed scene grid 402.

The grid display 402 may be superimposed/placed over a film image to compare the aspects of the film image (characters, scenery, etc.) with the locations of the potential marking areas (step 212). Advantageously, the exact position of the grid 402 relative to the film print with image can be determined, and accordingly, the exact location of the mark relative to the image in the film can be assessed. A superimposed image may be reviewed and ideal grid intersections/potential mark areas (as well as, e.g., frame numbers) may be determined for marking.

Returning to FIG. 2, at step 214, the color analyzer 104 performs an analysis of the color values for the test block 400 and the RMSE calculator 118 performs an analysis of the test block, i.e., potential marking area, and a test area surrounding each potential marking area in the frame. The marking module 114 analyzes a plurality of potential marking areas to determine test areas which are 'ideal' (recommended/acceptable) for applying a mark.

Preferably, a sequence analyzer 102 analyzes each sequence of consecutive frames having ideal marking locations for determining actual marking locations in the film. For example, a location in the film where an actual mark may be placed may comprise a sequence of frames in which at least one condition, e.g., a location having the lowest calculated RMSE, is satisfied at a specific location within at least two out of the sequence of consecutive frames tested. The sequence analyzer 102 reviews the film and selects all the sequences of the predetermined number of consecutive frames in the film where at least one condition is satisfied at a particular location in at least two consecutive frames out of each sequence of frames tested. The process of step 214 is explained further with reference to FIG. 3.

According to an aspect of the present invention, for each potential marking area of a frame, a color analysis is performed by to determine recommended/acceptable marking areas for applying a mark. FIG. 3 depicts an exemplary color analysis process of step 214 according to one embodiment of the present invention.

In step 302 of FIG. 3, a particular potential marking area location, e.g., coordinates (X,Y) within a frame in a sequence of frames equal to the number of consecutive frames to be marked (e.g., provided at step 210) is determined. For example, in FIG. 4, a particular location is located at coordinates (2,C) on grid 402.

In step 304, it is assessed whether the image is in a RGB format. If no (for example, the image is in YUV color format), a color space conversion is preferably performed and the image, or the block 400 of the potential mark, is converted to RGB format. A color analysis is performed for the block 400 at the grid intersection to determine the color of the pixels in the block. Preferably, a color analysis according to the present invention is based on the RGB (Red Green Blue) color model format. A color in the RGB color model can be described via numeric representations which indicate how much of each of the red, green and blue color is included. Each color can vary between minimum (no color) and maximum (full intensity). If all the colors are at a minimum, the result is black, whereas if all the colors are at maximum, the result is white. Color values may be written as numbers in the range 0 to 255; for example, full intensity red may be written as: 255, 0, 0.

After the color of the test block 400 is determined, it is determined, at step 306, whether the color of the test block is compatible with the marking device. The algorithm of the present invention will determine the best potential marking area which will make the mark as invisible as possible but robust. However, certain colors of the marking device will have an adverse effect on particular colors of the test block. A plurality of pre-stored conditions may be program in a database on storage device 122. The color analyzer 116 will compare the color of the test block with a predetermined color of the mark to be used against these stored conditions to determine if the test block is compatible with the predetermined color of the mark. For example, if the marking device uses a red laser, a completely blue or green test block 400 should not be used. Therefore, if at step 306, it is determined the test block is incompatible with the marking device, the location of the incompatible test block will be recorded in a database on storage device 122 and the process, at step 308, will go to the next location, e.g., coordinates (2,D). Otherwise, the process will continue to step 310.

If the test block is compatible with the marking device, the test block, at step 310, is saturated in the color of the marking device, i.e., it is simulated that the potential marking area is marked or burned with a color of the marking device. This saturation process is performed by altering each of the RGB values in each of the pixels in the test block. The percentage change to each RGB value for a particular color of a marking device may be determined from experimentation of test sequences on actual film and stored in a database on storage device 122. These percentage values will then be applied to each RGB value in each pixel of the test block. For example, if a red color marking device, e.g., a laser, is employed, the red color device will saturate, or affect, the red color of the RGB the most on the film. The red color intensity (the R value) loses around 70% of its value after it has been saturated on film by a marking device, while the red mark affects the green color 10% and the blue color 15%. For example, if the pixel intensity for red is 100, green is 100 and blue is 100, then after saturating the pixel of the test block, the intensity value for the same pixel location for red is 30, green 90 and blue is 85.

After the test block is saturated, the root mean square error (RMSE) for the test block 400 and the surrounding test area 401 is calculated, in step 312, as follows:

$$\text{RMSE} = \text{square root}[\{(x1-y11)+(x2-y12)+\ldots+(x1-ym1)\ldots+(xn-ymn)\}/<\text{number of pixels per block}*\text{number of surrounding blocks}>]$$

where x1, x2, . . . are pixels in the test block; ym1, ym2 . . . are the pixels in the mth surrounding block, n is the number of pixels per block, and m is the number of surrounding blocks. In one embodiment, the x and y values are the color values of just the color of the predetermined mark, e.g., the R value of each pixel. In another embodiment, the x and y value will be the RGB values of each pixels, i.e., three numbers.

The calculated RMSE along with the coordinates for the location are stored in the database 122 for later analysis by the sequence analyzer 120. At this point, the RMSE calculator may also employ a clipping algorithm to reject potential marking areas that have a RMSE value below a first predetermined threshold, i.e., the tested area is very bright, or above a second predetermined threshold, i.e., the tested area is too dark.

In step 314, it is determined whether all locations on a particular frame have been analyzed. If all locations have not been analyzed, the process will go to the next location within the particular frame. For example, if location 2, C (X,Y coordinates) was the last location analyzed in the grid 402 of FIG. 4, the next location in frame 404 to be analyzed will be location 2, D. Otherwise, if all locations in a particular frame have been analyzed, the process will go to the next frame (step 316).

In step 318, it is assessed whether at least a minimum number of successive frames in the film have been tested. If not, the process proceeds to step 308 and analyzes the next frame. If so, the sequence analyzer 120 will determine, at step 320, the same locations in successive frames having the lowest RMSE. Additionally, the calculated RMSE of the same location from the successive frames must be within a predetermined range of each other, i.e., the calculated RMSE for a given location has not changed significantly from one frame to the next. The location with the lowest calculated RMSE in successive frames will be determined to be the best potential marking area. Preferably, at least two consecutive frames must be marked for an effective marking of the film. Therefore, if no recommended/acceptable marking areas are found for at least two consecutive frames in the film or if there are no desired/suitable marking areas within at least two consecutive frames, the algorithm according to the present invention is applied to a next set of the predetermined number of consecutive frames in the film.

It is to be appreciated that step 320 may be performed after a minimum number of frames have been analyzed or after all the frames have been analyzed and the results stored in storage device 122. In the latter embodiment, the sequence analyzer 120 will also determined which successive frames have the lowest calculated RMSE in the film. Furthermore, after the sequence of frames have been determined, the location in the frame (i.e., X and Y coordinates) and a frame number, sequence of frame number or other indication will be stored in database 122 for later retrieval. This ensures that all possible marking locations in each sequence of frames in the film are found. This is advantageous because a studio might not like certain mark locations in a particular sequence and may desire alternative locations in the same sequence. Also, the studio has to decide how many marks they desire to be placed in each sequence.

After the analysis of FIG. 3 is complete, the software, e.g., marking module 114, indicates all ideal (recommended/acceptable) marking areas, which can then be displayed for review by a user, e.g., on the grid layout superimposed on the image (step 216). The user may then select preferred locations for marking and/or preferred frames for marking via a pointing device. Alternatively, the marking module 114 can determine the selected locations automatically based on a predetermined acceptable RMSE, a predetermined number of marks per film, a predetermined minimum number of marks per frame and a predetermined number of consecutive frame to be marked. These values may be pre-entered by the user via the user interface 112, for example, typically 5 or 6 marks are selected per frame.

The present invention enables marks to be as invisible as possible, yet robust, and includes a color analysis during its determination of ideal marking locations. Advantageously, according to one aspect, the present invention provides a method for determining and selecting ideal locations for placement of marks in a film/digital cinema. Marks are thus optimized in location and are therefore durable and robust such that a film marked according to the present invention provides minimal impact to the film viewer, while ensuring maximum likelihood of successful forensic analysis, identification and mark recovery during evaluation of a pirated copy of such marked film.

Although the embodiment which incorporates the teachings of the present invention has been shown and described in detail herein, those skilled in the art can readily devise many other varied embodiments that still incorporate these teachings. Having described preferred embodiments for a system and method for analyzing and marking a film (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. It is intended that all such modifications, substitutions and additions fall within the scope of the present invention which is best defined by the claims below.

What is claimed is:

1. A system for analyzing and marking a film comprising:
a prescreening device configured to superimpose a depiction of potential marking areas on at least one frame of the film, the prescreening device including a marking module, the marking module comprising:
a color analyzer configured to saturate at least two potential marking areas in a predetermined color of a mark; and
a root mean square error calculator configured to calculate a root mean square error of each of the at least two potential marking areas and an area surrounding each potential marking area;
wherein the marking module is further configured to determine which of the at least two potential marking areas has the lowest root mean square error.

2. The system of claim 1, wherein the color analyzer is further configured to analyze the color of each potential marking area and to determine whether the potential marking area is compatible with a predetermined color of a mark.

3. The system of claim 1, further including a database operably connected to the prescreening device to store the location of the potential marking area having the lowest root mean square error and an indication of the at least one frame.

4. The system of claim 1, wherein the marking module further comprises a sequence analyzer configured to determine the potential marking area having the lowest root mean square error for the same location in at least a predetermined number of consecutive frames.

5. The system of claim 1, wherein the depiction of potential marking areas comprises points of intersection of a plurality of intersecting identification axes.

6. The system of claim 1, further comprising a film printer operably connected to the prescreening device.

7. The system of claim 1, further comprising a scanning device operably connected to the prescreening device to convert a film print to computer-readable form.

8. The system of claim 1, further comprising a display device for displaying at least one frame indicating a location for a potential marking area.

9. A method for determining mark locations in a film comprising the steps:
- selecting at least two potential marking areas in at least one frame of the film;
- calculating a root mean square error of each of the at least two potential marking areas and an area surrounding each potential marking area; and
- determining which of the at least two potential marking areas has the lowest root mean square error.

10. The method of claim 9, wherein the step of selecting at least two potential marking areas further comprises the steps:
- superimposing a grid including identification axes on the at least one frame;
- determining the position of the grid relative to the frame; and
- selecting a location of the potential marking areas as comprising points of intersection of the identification axes.

11. The method of claim 10, further comprising the step determining the potential marking area having the lowest root mean square error for the same location in at least a predetermined number of consecutive frames.

12. The method of claim 10, further comprising the step storing the location of the potential marking area having the lowest root mean square error with an indication of the least one frame.

13. The method of claim 12, wherein indication of the at least one frame is at least one of a frame number and a time from the start of the film.

14. The method of claim 9, further comprising the step saturating the at least two potential marking areas in a predetermined color of a mark.

15. The method of claim 9, wherein the selecting step further comprises the step determining whether the at least two potential marking areas are compatible with a predetermined color of a mark.

16. The method of claim 9, wherein the selecting at least two potential marking areas further comprises determining a test block size of the at least two potential marking areas based on a mark size of a marking device for marking the film.

17. The method of claim 16, wherein the area surrounding each potential marking area is a 3×3 grid of blocks, each block being substantially the same size as the size of the test block.

18. The method of claim 17, wherein the root mean square error is calculated as $$\text{root mean square error} = \text{square root}[\{(x1-y11)+(x2-y12)+\ldots+(x1-ym1)\ldots+(xn-ymn)\}/<\text{number of pixels per block}*\text{number of surrounding blocks}>]$$

where x1, x2, ... are pixels in the test block; ym1, ym2 ... are the pixels in the mth surrounding block, n is the number of pixels per block, and m is the number of surrounding blocks.

19. The method of claim 9, further comprising displaying the potential marking area having the lowest root mean square error superimposed on the least one frame for user selection.

20. A program storage device readable by a machine, tangibly embodying a program of instructions executable by the machine to perform method steps for determining mark locations in a film, the method steps comprising:
- selecting at least two potential marking areas in at least one frame of the film;
- saturating the at least two potential marking areas in a predetermined color of a mark;
- calculating a root mean square error of each of the at least two potential marking areas and an area surrounding each potential marking area; and
- determining which of the at least two potential marking areas has the lowest root mean square error.

* * * * *